(12) United States Patent
De Smet et al.

(10) Patent No.: US 10,574,714 B2
(45) Date of Patent: Feb. 25, 2020

(54) STREAM-BASED REACTIVE PROGRAMMING PLATFORM

(71) Applicant: Microsoft Technology Licensing, LLC, Redmond, WA (US)

(72) Inventors: Bart J. F. De Smet, Bellevue, WA (US); Tihomir T. Tarnavski, Sammamish, WA (US); Savas Parastatidis, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 735 days.

(21) Appl. No.: 14/314,080

(22) Filed: Jun. 25, 2014

(65) Prior Publication Data

US 2015/0381679 A1    Dec. 31, 2015

(51) Int. Cl.
*H04L 29/06* (2006.01)
*G06F 16/9535* (2019.01)
*H04L 29/08* (2006.01)

(52) U.S. Cl.
CPC .......... *H04L 65/60* (2013.01); *G06F 16/9535* (2019.01); *H04L 67/32* (2013.01)

(58) Field of Classification Search
CPC ....................................................... H04L 65/60
See application file for complete search history.

(56) References Cited

U.S. PATENT DOCUMENTS 7,970,892 B2   6/2011   Sedukhin et al.
8,099,494 B2   1/2012   Sedukhin et al.
(Continued)

FOREIGN PATENT DOCUMENTS

CN   103399908 A    11/2013
WO   2013055711 A2   4/2013

OTHER PUBLICATIONS

Gedik, et al., "SPADE: The System S Declarative Stream Processing Engine", In Proceedings of Acm Sigmod International Conference on Management of Data, Jun. 9, 2008, 12 pages. http://cs.ucsb.edu/~ckrintz/papers/gedik_et_al_2008.pdf.
(Continued)

*Primary Examiner* — Moustafa M Meky
*Assistant Examiner* — Sm Z Islam

(57) ABSTRACT

Stream-based programming models allow subscriber to observe a stream of stream items received from a source, such as event notifications and updates to observed data. Presented herein is a stream-based reactive programming platform that allows observers to discover sources and streams, and to specify queries applicable to sources that results in new streams, including conditions that apply to the properties of a federation of sources. Variations of the reactive programming platform include generating a new stream from a non-reactive data source; generating a graph of sources and observers; and providing a directory of discoverable elements respectively identified by uniform resource identifiers. The reactive stream-based programming platform may also permit parameterization to configure the functionality of the elements participating in the stream; delegation of query tasks to discoverable elements of the programming platform; and federation of a heterogeneous set of elements to achieve a query using the reactive stream-based programming platform.

20 Claims, 9 Drawing Sheets

(56) References Cited

U.S. PATENT DOCUMENTS

| | | | |
|---|---|---|---|
| 8,230,386 B2 | 7/2012 | Sedukhin et al. | |
| 8,239,505 B2 | 8/2012 | Sedukhin et al. | |
| 2006/0242040 A1* | 10/2006 | Rader | G06Q 40/00 |
| | | | 705/35 |
| 2007/0043803 A1 | 2/2007 | Whitehouse et al. | |
| 2007/0083894 A1* | 4/2007 | Gonsalves | G06F 16/958 |
| | | | 725/46 |
| 2007/0260674 A1* | 11/2007 | Shenfield | G06F 17/30864 |
| | | | 709/203 |
| 2009/0006320 A1 | 1/2009 | Ding et al. | |
| 2009/0193443 A1* | 7/2009 | Lakshmanan | G06F 9/544 |
| | | | 719/330 |
| 2010/0131556 A1 | 5/2010 | Meijer et al. | |
| 2010/0293301 A1* | 11/2010 | Amini | G06F 9/544 |
| | | | 710/12 |
| 2011/0197032 A1* | 8/2011 | Patey | G06F 17/3048 |
| | | | 711/133 |
| 2012/0084749 A1 | 4/2012 | Gogh et al. | |
| 2012/0331000 A1* | 12/2012 | Mehra | G06F 16/24568 |
| | | | 707/769 |
| 2013/0097198 A1* | 4/2013 | Goteti | G06Q 10/06393 |
| | | | 707/769 |
| 2013/0117736 A1 | 5/2013 | Smet et al. | |
| 2013/0166569 A1 | 6/2013 | Navas | |

OTHER PUBLICATIONS

Lucas, et al., "Collage: A Declarative Programming Model for Compositional Development and Evolution of Cross-Organizational Applications", Retrieved on: Nov. 26, 2013, pp. 6, Available at: http://www.w3.org/2007/02/dmdwa-ws/Papers/charlie-wiecha.pdf.

PCT International Search Report and Written Opinion in International Application PCT/US2015/037294, dated Oct. 30, 2015, 11 pages.

PCT Second Written Opinion in PCT/US2015/037294, dated May 30, 2016, 9 pages.

PCT International Preliminary Report on Patentability in PCT/US2015/037294, dated Sep. 28, 2016, 9 pages.

Microsoft StreamInsight, located online on Dec. 18, 2017 at: https://technet.microsoft.com/library/ee362541(sql.105).aspx, 2017, 2 pages.

"Get Started with StreamInsight 2.1", located online on Dec. 18, 2017 at: https://social.technet.microsoft.com/wiki/contents/articles/14436.get-started-with-streaminsight-2-1.aspx, 2 pages.

"StreamInsight for Non-Programmers", located online on Dec. 18, 2017 at: https://social.technet.microsoft.com/wiki/contents/articles/14437.streaminsight-for-non-programmers.aspx, 2 pages.

"Office action Issued in European Patent Application No. 15736729.3", dated Mar. 13, 2019, 12 Pages.

"First Office Action Issued in Chinese Patent Application No. 201580034342.8", dated Apr. 3, 2019, 15 Pages.

"Second Office Action Issued in Chinese Patent Application No. 201580034342.8", dated Sep. 19, 2019, 5 Pages.

* cited by examiner

STREAM-BASED REACTIVE PROGRAMMING PLATFORM

BACKGROUND

Within the field of computing, many scenarios involve an architecture including a stream for notifying subscribers of stream items, such as the provision of new stream items, changes in an observed variable, or events within a computing framework. In such models, subscribers are notified of new stream items spontaneously (e.g., without having to poll a subscribed data source for updates), and data items are delivered to the subscriber in the manner of a stream, e.g., a sequence of data items delivered to the subscribers according to the order in which the data items were inserted into the stream by the data source.

As a first such example, in a Real Simple Syndication (RSS) publish/subscribe feed, a user may request notifications when one or more publishers establishes a new publication, such as an article posted on a website. A syndication host may fulfill the request by periodically checking with the subscribed publishers, retrieving new syndicated items, and presenting them to the user.

As a second such example, in an object-oriented observation model, when a first object with a property is instantiated (e.g., a member field of the object, or a value of a visual user interface that is controllable via user input), a stream may be automatically created for updates to the property. A second object may request a subscription to the stream, and therefore may be spontaneously notified when the property changes.

As a third such example, in an event stream model, an event source may provide an event stream, and, upon detecting an instance of an event, may insert event notifications into the event stream. An object may request to subscribe to the event stream, and the event platform may deliver the event notifications to the object in order to fulfill the subscription request of the object. Many such subscription-based streams may be devise and utilized in a variety of scenarios arising within the field of computing.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In many subscription-based stream models, the existence and characteristics of the data stream are specified either by the computing environment (e.g., an operating system may automatically generate streams for the respective fields of objects in use), a user (e.g., an author of web content may configure a website to provide a stream of new content items), and/or a stream source (e.g., a class may specify both that respective objects may provide a stream, and how the objects insert stream items into the stream). However, these models may not enable a subscriber to create a stream in order to observe a source; i.e., if the source does not provide a stream, the observer is only able to utilize alternative techniques, such as polling, in order to achieve the observation of the source. Additionally, such models may provide only limited capacity for a subscriber to create and/or alter a stream. For example, some stream models may enable a particular observer to specify a stream filter, and to receive only some stream items inserted into the stream. However, this stream filter does not alter the content of the stream, and does not affect the stream items provided to other observers who have subscribed to the same stream; each such other subscriber may either specify a stream filter or receive the full contents of the stream.

Presented herein is a stream-based reactive programming platform, wherein a set of observers may not only observe streams provided by sources, but may also specify new streams to which observers may subscribe. In accordance with these techniques, an observer may submit a query that specifies a condition on a property of a data source (e.g., that the value of a particular stock reported by a stock exceeds a price ceiling), and the programming platform may generate a stream for the query. The observer and other observers may then subscribe to the stream, and the programming platform may register such observers as subscribers of the stream. When the programming platform detects a fulfillment of the condition of the query, the programming platform may insert a new stream item into the stream representing the fulfillment of the query, and may deliver the stream item to all subscribers of the stream.

The stream-based reactive programming platform provided herein may be extended in a variety of aspects. As a first such example, an observer that requests a subscription to a stream may monitor the stream items, or may specify or provide an agent that monitors the stream items on behalf of the observer. As a second such example, an observer that is observing a stream may also comprise a source of the stream; e.g., an observer may publish stream items into the stream as well as receive stream items published by other sources into the same stream. As a third such example, the elements of the stream-based reactive programming platform—e.g., the observers, sources, streams, and subscriptions—may support a shared set of properties, such as parameterization through the specification of a parameter that affects the functionality of each such element. As a fourth such example, the stream-based programming platform may be provided in a manner that enables service-to-service, service-to-device, and device-to-device communication in an equivalent manner as user-to-service and user-to-device, such that the functionality of each element is exposed and available to any other element of the reactive stream-based programming platform. These and other variations of the stream-based programming platform provided herein may present a reactive programming model that enables the generation and alteration of streams over sources as specified by observers, in accordance with the techniques presented herein.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
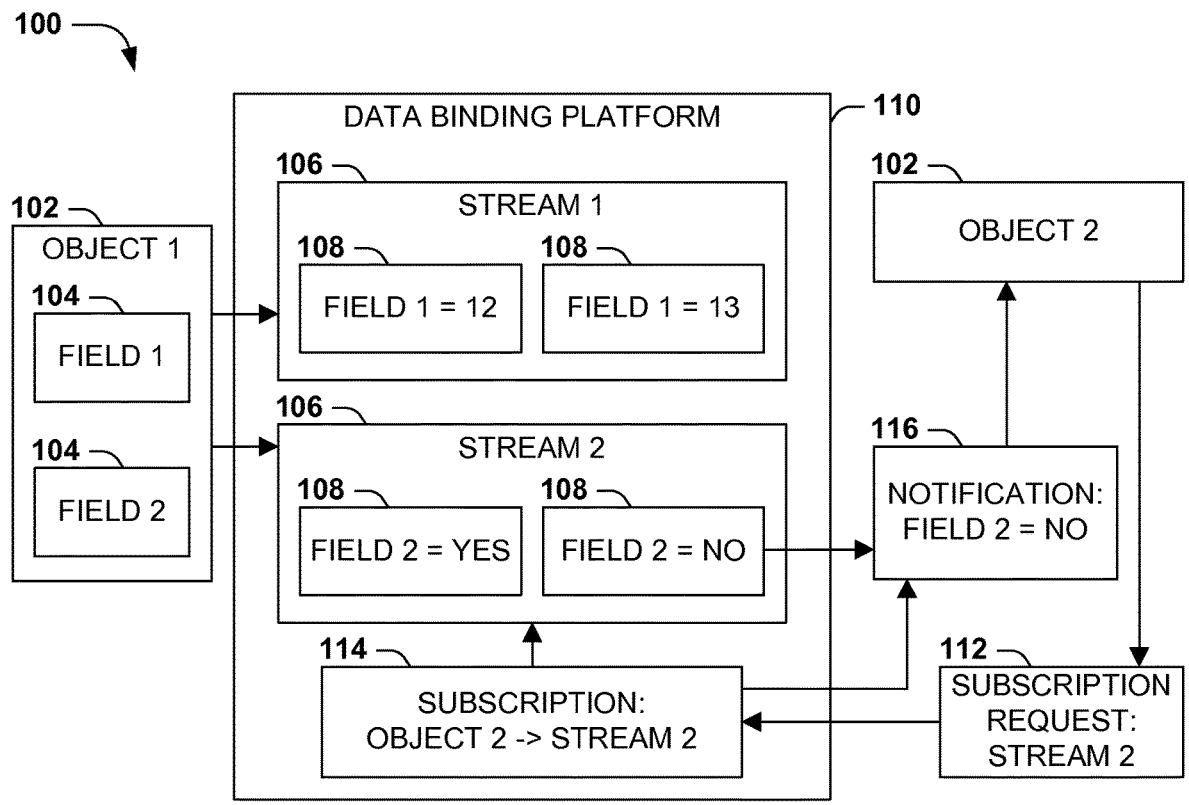
FIG. 1 is an illustration of an exemplary scenario featuring a first stream-based publication/subscription technique for notifying an object of updates to the fields of an object.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

In the field of computing, many scenarios involve a subscription-based stream, wherein a source of the stream publishes a set of stream items, which are delivered in sequence to one or more subscribers. In such scenarios, an observer may submit a subscribe request to a stream manager, and may receive stream items from the source via the stream until submitting an unsubscribe request to the stream manager. The concept of subscription-based streams is applicable to many areas of computing, where both the source and the subscribers may comprise, e.g., humans, devices, applications, or data sources, or combinations thereof.

A first scenario involving subscription-based streams is the Real Simple Syndication (RSS) protocol, wherein a source of data may generate and update a list of stream items. A user may request a syndication reader to retrieve the list periodically, and to notify the user when the syndication reader discovers the addition of new stream items to the list.

FIG. 1 is an illustration of an exemplary scenario 100 featuring the use of subscription-based stream techniques in a data binding model, in order to enable objects 102 to observe change to fields 104 of other objects 102. In this exemplary scenario 100, when a first object 102 is instantiated comprising two fields 104 (e.g., an integer and a Boolean value), a data-binding platform 110 may generate a stream 106 for the respective fields 104 of the object 102, to which other objects 102 may subscribe in order to observe changes to the fields 104 of the first object 102. When a field 104 of the object 102 changes, if no other object 102 is subscribed to the stream 106 for the field 104, then the subscription platform 110 may take no action; but if at least one object 102 is subscribed to the stream 106, then the data-binding platform 110 may generate a stream item 108 representing a notification 116 of the update of the field 104, and insert the stream item 108 into the stream 106. Accordingly, when a second object 102 submits a subscription request 112 to subscribe to the second stream 106 corresponding to the second field 104 of the first object 104, the data-binding platform 110 may store a subscription 114 for the second object. When the second field 104 of the first object 102 changes, the data-binding platform 110 may generate a stream item 108 indicating the new value of the field 104, and may send to the second object 102 a notification 116 of the stream item 108. In this manner, streams 106 may be utilized in a data-binding model to notify objects 102 of updates to the fields 104 of other objects 102.

Figure 2:
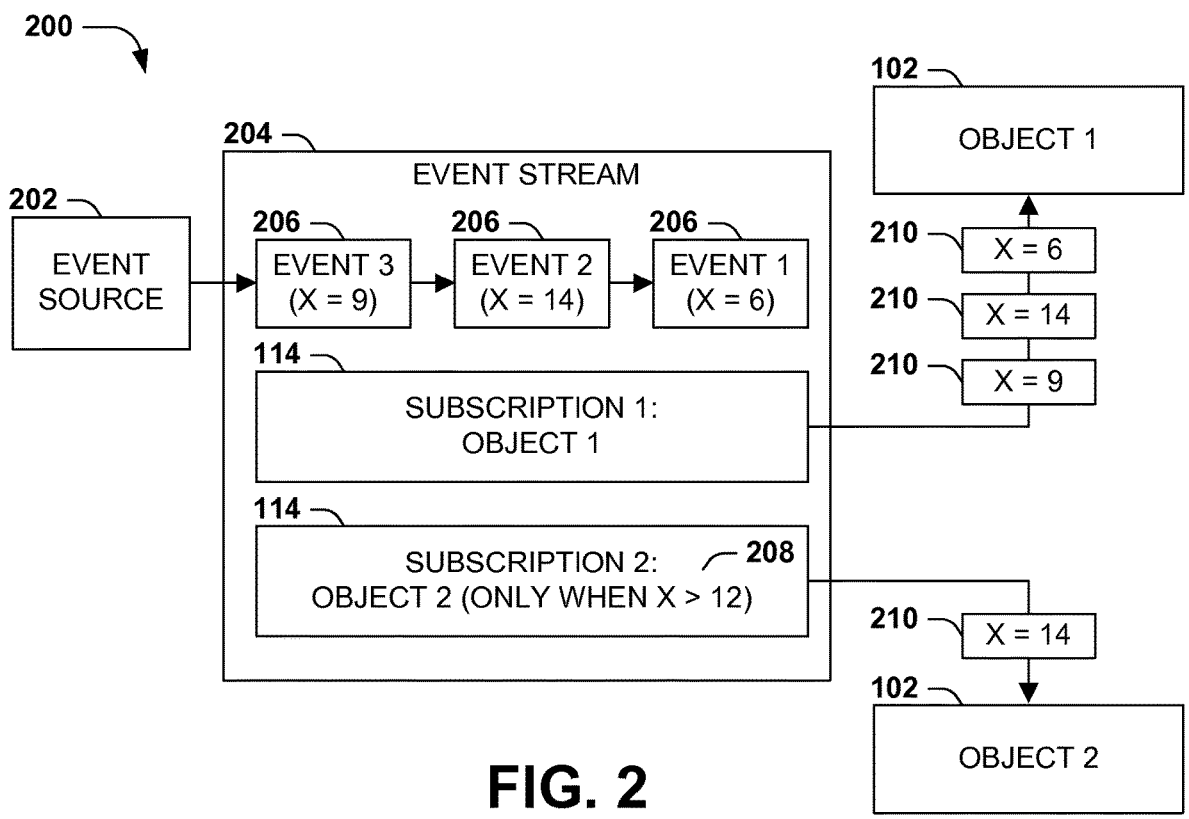
FIG. 2 is an illustration of an exemplary scenario featuring a second stream-based publication/subscription technique for informing an object of events arising within a computing environment.

FIG. 2 presents an illustration of an exemplary scenario 200 involving a subscription-based stream provided in order to notify objects 102 of events 202 arising within a computing environment. In this exemplary scenario 200, an event source 202 detects or identifies a series of events 206, such as the receipt of user input through a user input device, or the completion of tasks by the device. A stream event 204 may be generated comprising a sequence of stream items 108 for the respective events 206. Two objects 102 may subscribe to the event stream 204, and the computing environment may record a subscription 114 for each object 102. Notably, the event stream 204 in this exemplary scenario 200 permits the objects 102 to specify a filter 208 indicating the events 206 that are of interest to the object 102; e.g., if the events 206 relate to changes in the value stored in a variable, the first object 102 may subscribe to all such events 206, while the second object 102 may specify a filter 208 indicating subscription only to events 206 where the value exceeds a particular threshold. Accordingly, the event stream 204 may deliver to the first object 102 a complete set of updates 210 representing notifications 116 of the respective events 206 of the event stream 204 (and may receive such updates 210 in correspondence with the order of the events 206 detected by the event source 202), while the second object 102 may receive only the updates 210 for events 206 that satisfy the filter 208. In this manner, the computing environment may enable the objects 102 to receive notifications of the events 206 of the event source 202 through a subscription-based event stream 204.

While many such stream-based techniques are utilized in the field of computing, including those illustrated in the exemplary scenarios of FIGS. 1 and 2, embodiments of such techniques often exhibit one or more limitations.

As a first exemplary limitation, many subscription-based stream platforms provide little or no assistance in enabling observers to discover available streams 106. For example, in the exemplary scenario 200 of FIG. 2, the objects 102 may only be able to request a subscription 114 to the event source 202 if the event source 202 is known by the developer; e.g., the developer may discover the existence and identifier of the event source 202 and may program the respective objects 102 to subscribe to it, but neither the developer nor the objects 102 may receive significant assistance in this endeavor from the computing environment. In this and other respects, many such subscription-based stream platforms depend upon the involvement of a developer, rather than facilitating an autonomous discovery of streams 106 by the objects 102.

As a second exemplary limitation, many subscription-based stream platforms do not typically allow an object 102 to create new streams 106, particularly when such streams 106 are not explicitly managed by the object 102. Rather, a second object 102 may be permitted to subscribe to streams 106 that are either created by a first object 102 or automatically created by the subscription-based stream platform for the first object 102, but are not permitted to specify new streams 106 applicable to the first object 102. For example, it may be desirable for an object 102 to subscribe to a stream 106 involving a comparison of properties of different types of objects or sources, such as comparing the prices of various stocks of interest in a stock quote system, and generating a stream 106 comprising stream items 106 representing events 206 such as the occurrence of significant differences in stock price. However, unless the object 102 includes logic for generating the stream 106 of its own accord (e.g., polling the data sources and identifying such events 206), subscription-based stream platforms typically do not assist with the process of generating new streams 106.

As a third exemplary limitation, many subscription-based stream platforms do not permit subscribers to alter the contents of a stream 106. While subscribers may choose to disregard some stream items 108 (e.g., specifying a filter 208 that enables subscription to a subset of stream items 108). However, such filters do not specify or alter the stream items 108 inserted into the stream 106, but rather enable the subscriber to disregard a portion of the stream 106. Notably, even if a first object 102 applies a filter 208 to the stream 106 does not typically affect the subscription 114 of a second object 102 to the same stream 106. In this manner, subscription-based stream platforms do not typically allow objects 102 to alter the operation of streams 106 that are not specifically managed by the objects 102.

B. Presented Techniques

Figure 3:
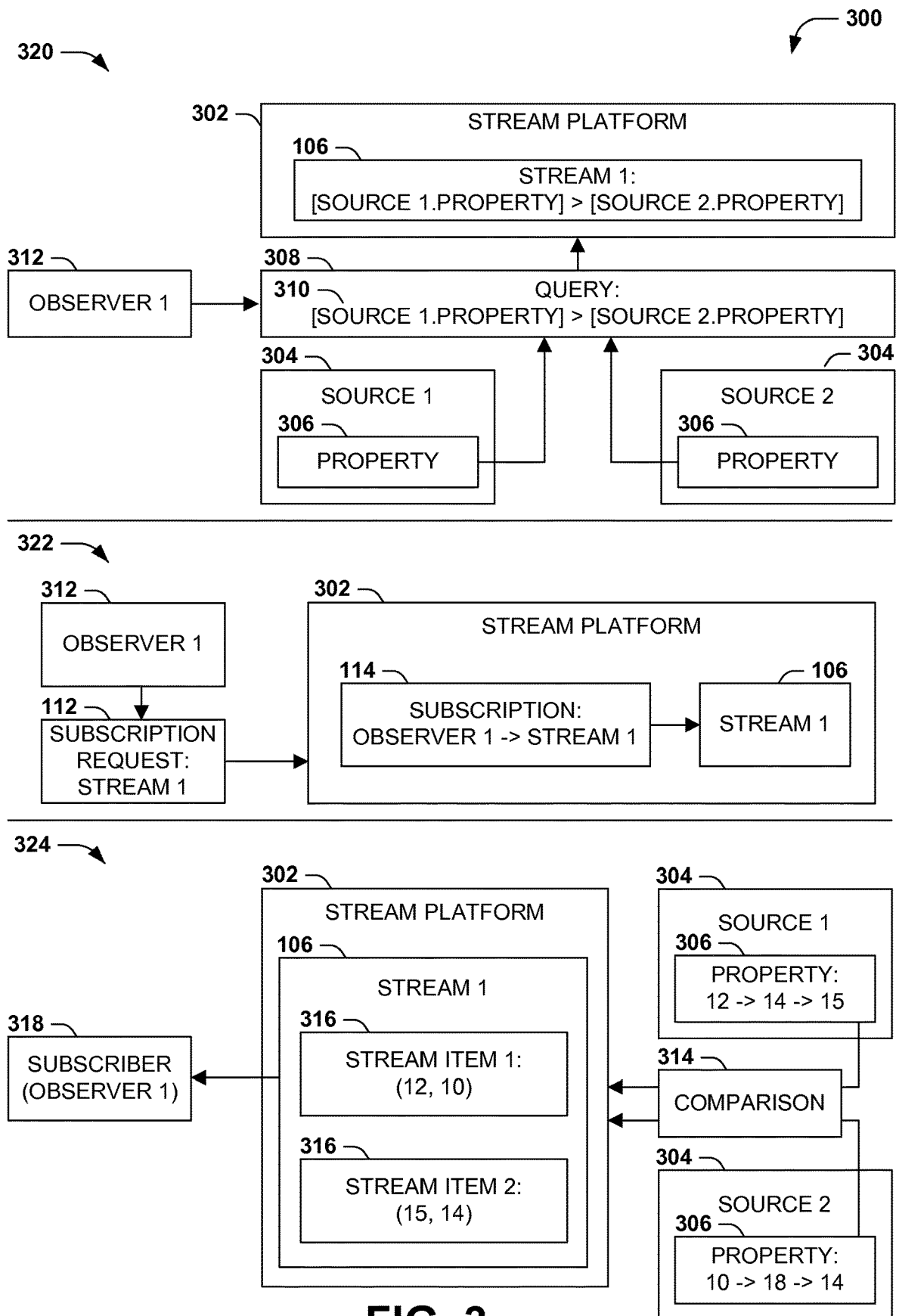
FIG. 3 is an illustration of an exemplary scenario featuring a stream-based reactive programming platform provided in accordance with the techniques presented herein.

FIG. 3 presents an illustration of an exemplary scenario 300 featuring a subscription-based stream platform 302 provided in accordance with the techniques presented herein. In this exemplary scenario 300, at a first time 320, the stream platform 302 receives, from an observer 312, a query 308 specifying two sources 304 respectively comprising a property 306 (e.g., a first object 102 and a second object 102, each object 102 comprising a field 104; or a first website and a second website, each website comprising a piece of data), and a condition 310 applicable to the properties 306 of the sources 304 (e.g., a numeric comparison indicating that the first property 306 of the first source 304 is greater than the second property 306 of the second source 304). The stream platform 302 may therefore initiate a stream 106 for the query 308 on behalf of the observer 312. While initiating the stream 106, the stream platform 302 may also assign an identifier to the stream 106 (e.g., a uniform resource identifier (URI)), and/or add the stream 106 to a directory of discoverable streams, in order to aid objects 102 in referring to and discovering the stream 106.

At a second time 322, the stream platform 302 may receive a subscription request 114 from an observer 312 specifying the stream 106, and may record a subscription 114 that adds the observer 312 as a subscriber 318 of the stream 106.

At a third time 324, the stream platform 302 may detect one or more instances of a fulfillment of the condition 310 of the query 308 (e.g., by periodically querying the sources 304 to detect an update of the properties 306 of the sources 304 that fulfills the condition 310, or by receiving a notification from the sources 304 indicating changes to the properties 306 that result in a fulfillment of the condition 310). The stream platform 302 may respond to the instances of detected fulfillment of the condition 310 by identifying the subscribers 318 of the stream 106, and delivering to the subscribers 318 stream item 316 that respectively indicate instances of the fulfillment of the condition 310 of the query 308. In this manner, the stream platform 302 may fulfill the queries 308 presented by the observer 312 in accordance with the techniques presented herein.

C. Technical Effects

The provision of a stream platform 302 in accordance with the techniques presented herein, such as illustrated in the exemplary scenario 300 of FIG. 3, may present a variety of technical effects as compared with other techniques, including those illustrated in the exemplary scenario 100 of FIG. 1 and the exemplary scenario 200 of FIG. 2.

As a first example, the stream platform 302 presented herein facilitates the discovery of streams 106 by observers 312 in an automated manner. For example, in some variations, the stream platform 302 may respond to requests to create a stream 106 by assigning an identifier (such as a uniform resource identifier) to the stream 106, and/or adding the stream 106 to a directory that may be requested by an observer 312. In other subscription-based stream platforms, such as the data binding platform 110 in the exemplary scenario 100 of FIG. 1, the platform may, upon instantiating a source 304, automatically initiate a stream 106 for one or more properties 306 of the source 304, but this initiation often does not include notifying observers 312 of the newly created streams 106; rather, such observers 312 are only able to access the streams 106 if the existence of the instantiated source 304 is known. Moreover, the stream platform 302 presented herein may allow the initiation of a stream 106 for a source 304 that provides no capacity for streaming updates to observers 312, and that is not intended for such monitoring and notification.

As a second example, the stream platform 302 presented herein enables an observer 312 to create a stream 106 by submitting the query 308 specifying the sources 304, properties 306, and conditions 310. The stream platform 302 automatically initiates the stream 106 reflecting the query 308. Accordingly, the observer 312 does not have to implement any aspects of the stream 106, including observing the properties 306 of the sources 304 and/or inserting new stream items 316 into the stream 106. By contrast, many computing platforms enable a source 304 to initiate and publish a stream 106 and to insert stream items 316, but do not provide assistance in achieving this functionality; the source 304 has to implement the details of the stream 106.

As a third example, the stream platform 302 presented herein may enable an observer 312 to specify a query 308 comprising a condition 310 that includes a variety of sources 304 and/or properties 306 to be monitored on behalf of the observer 312. For example, the observer 312 may submit a query 308 specifying two or more sources 304 of stock information, and a condition 310 involving a comparison of the properties 306 of the sources 304 (e.g., a comparison of the stock price of a first stock indicated by a first stock database, and a second stock price indicated by a second stock database). The stream 106 initiated on behalf of the observer 312 may therefore exhibit a more sophisticated condition 310 involving a variety of sources 304 and properties 306, optionally spanning objects, devices, and even domains. Such sophisticated streams may not be achievable within conventional stream platforms, which typically generate streams 106 at the request of each object 102, and only over the domain of the object 102 (e.g., the stream 106 of a data-bound object 102 may be limited to updates to the fields 104 of the object 102). Moreover, the stream platform 302 automatically generates the infrastructure to detect the fulfillment of the condition 310, where such infrastructure may involve, e.g., monitoring a variety of sources 304. The observer 312 may therefore receive notifications of the fulfillment of such sophisticated conditions without having to provide any implementation of such monitoring and evaluation.

As a fourth example, the stream platform 302 presented herein may enable an observer 312 to specify or alter the operation of a stream 106 in a manner that affects the other observers 312 of the stream 106. For example, an observer 312 may request the initiation of a stream 106 according to a particular query 308, or may update the query 308 represented by the stream 106, and other observers 312 of the same stream 106 may therefore receive a particular or different set of stream items 316. By contrast, other stream platforms typically do not allow an observer 312 to specify or alter the stream 106; rather, observers 312 are typically limited to subscribing to and/or unsubscribing from the stream 106. Even in scenarios where an observer 312 may submit a filter 208 that excludes the notification of stream items 206 that are not of interest to the observer 312, the filter 208 provided by a first observer 312 does not typically alter the presentation of the stream 106 to a second observer 312 of the same stream 106.

As a fifth example, the stream platform 302 presented herein may enable an observer 312 to participate in the stream 106 as a source 304. That is, while many stream models confine respective participants in the stream 106 to the role of an observer 312 or a source 304, the stream platform 302 provided herein may enable an observer 312 also to publish stream items 312 into the stream 106. Alternatively or additionally, an observer 312 may comprise an entity that requests the subscription 114 to the stream 106, and/or that observes the stream items 312 published to the stream 106; i.e., an entity may request that the stream platform 302 notify it of stream items 312 published to the stream 106, may specify a second entity that is to be notified of such published stream items 312, and/or may provide an agent that is to be notified of such published stream items 312 and that evaluates and responds to such stream items 312 on behalf of the entity.

As a sixth example, the stream platform 302 presented herein may provide a shared set of properties among the elements of the stream platform. As one such example, the stream platform 302 may support the specification of parameters for the respective streams 106, sources 304, observers 312, and subscriptions 114 that may affect the functionality of each such element. For example, the respective elements may be templatized according to a stream item type (e.g., a type of stream item 312 published within the stream 106), and any element may have functionality directed to a particular type of stream item 312 specified as a parameter, such that all of the elements involved in the stream may be interoperatively configured to respond correspondingly to the stream item type of interest.

As a seventh example, the stream platform 302 presented herein may facilitate the delegation and federation of computational processes among a distributed set of devices and/or services. The flexibility provided by the stream platform 302 may enable the fulfillment of a query by discovering a variety of devices and services that are capable of performing respective tasks of the query, and may create a stream that enables the interoperation of the selected devices and services to fulfill the query, due to the robustness and flexibility achievable by the stream platform 302. These and other technical effects may be achieved through the fulfillment of queries 308 on behalf of observers 312 through the provision of a stream platform 302 in accordance with the techniques presented herein.

D. Exemplary Embodiments

Figure 4:
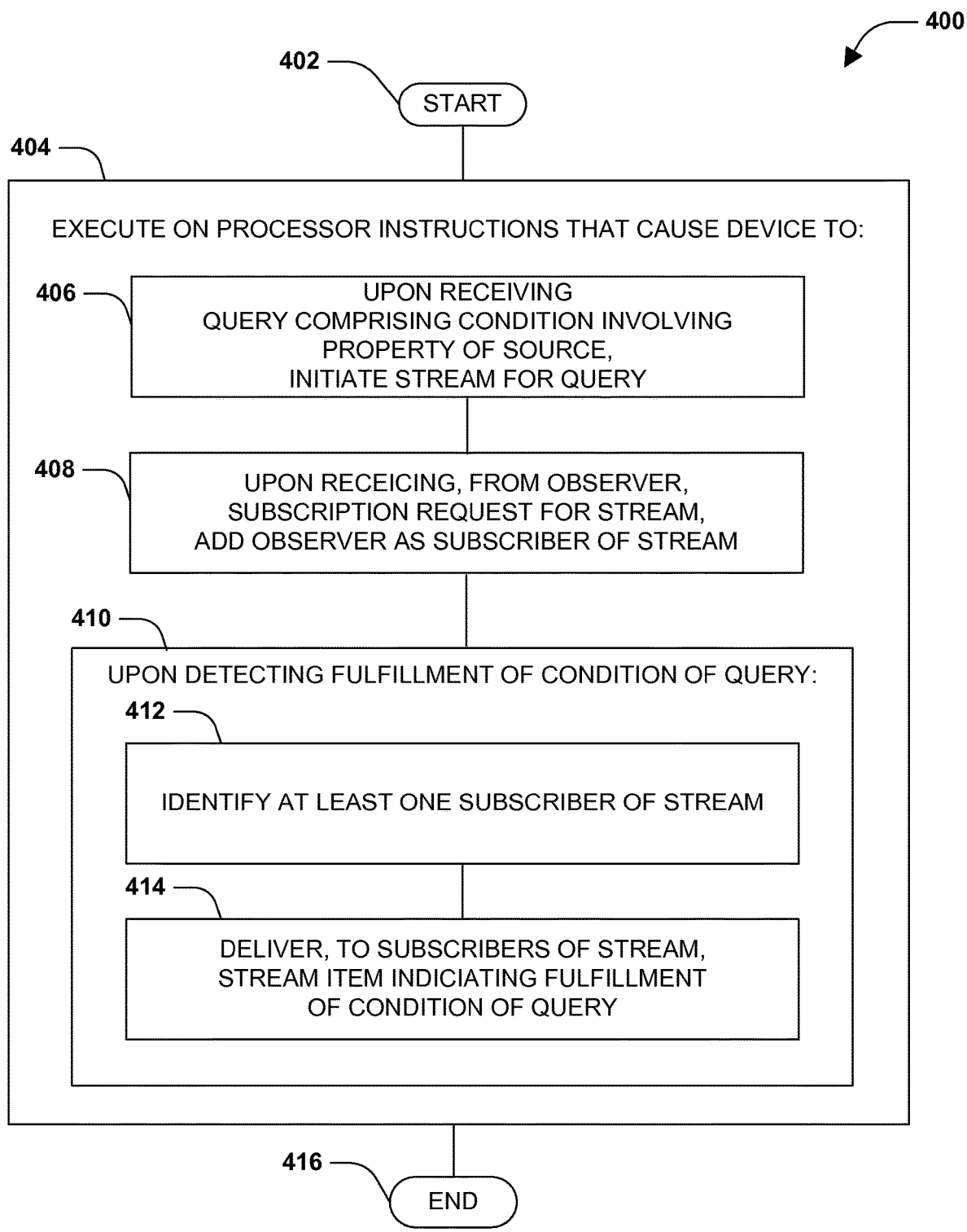
FIG. 4 is an illustration of an exemplary method for fulfilling queries on behalf of observers using a stream-based reactive programming platform in accordance with the techniques presented herein.

FIG. 4 presents an illustration of an exemplary first embodiment of the techniques presented herein, illustrated as an exemplary method 400 of fulfilling queries 308 on behalf of observers 312 through the provision of a stream platform 302. The exemplary method 400 may be implemented, e.g., as a set of instructions stored in a memory component (e.g., a memory circuit, a platter of a hard disk drive, a solid-state storage device, or a magnetic or optical disc) of a device having a processor, where the instructions, when executed on the processor, cause the device to operate according to the techniques presented herein. The exemplary method 400 begins at 402 and involves executing 404 the instructions on the processor of the device. In particular, the execution of the instructions on the processor causes the device to, upon receiving, from an observer 312, a query 308 comprising a condition 310 involving a property 306 of a source 304, initiate 406 a stream 106 for the query 310 on behalf of the observer 312. The execution of the instructions on the processor further causes the device to, upon receiving, from an observer 312, a subscription request 112 for the stream 106, add 408 the observer 312 as a subscriber 318 of the stream 106. The execution of the instructions on the processor further causes the device to, upon detecting 410 a fulfillment of the condition 310 of the query 308, identify 412 at least one subscriber 318 of the stream 106; and deliver 414, to the subscribers 318 of the stream 106, a stream item 108 indicating the fulfillment of the condition 310 of the query 308. By presenting the stream items 108 of the stream 106 indicating the fulfillment of the query 308, the execution of the instructions on the processor causes the device to provide a stream platform 302 operating in accordance with the techniques presented herein, and so the exemplary method 400 ends at 416.

Figure 5:
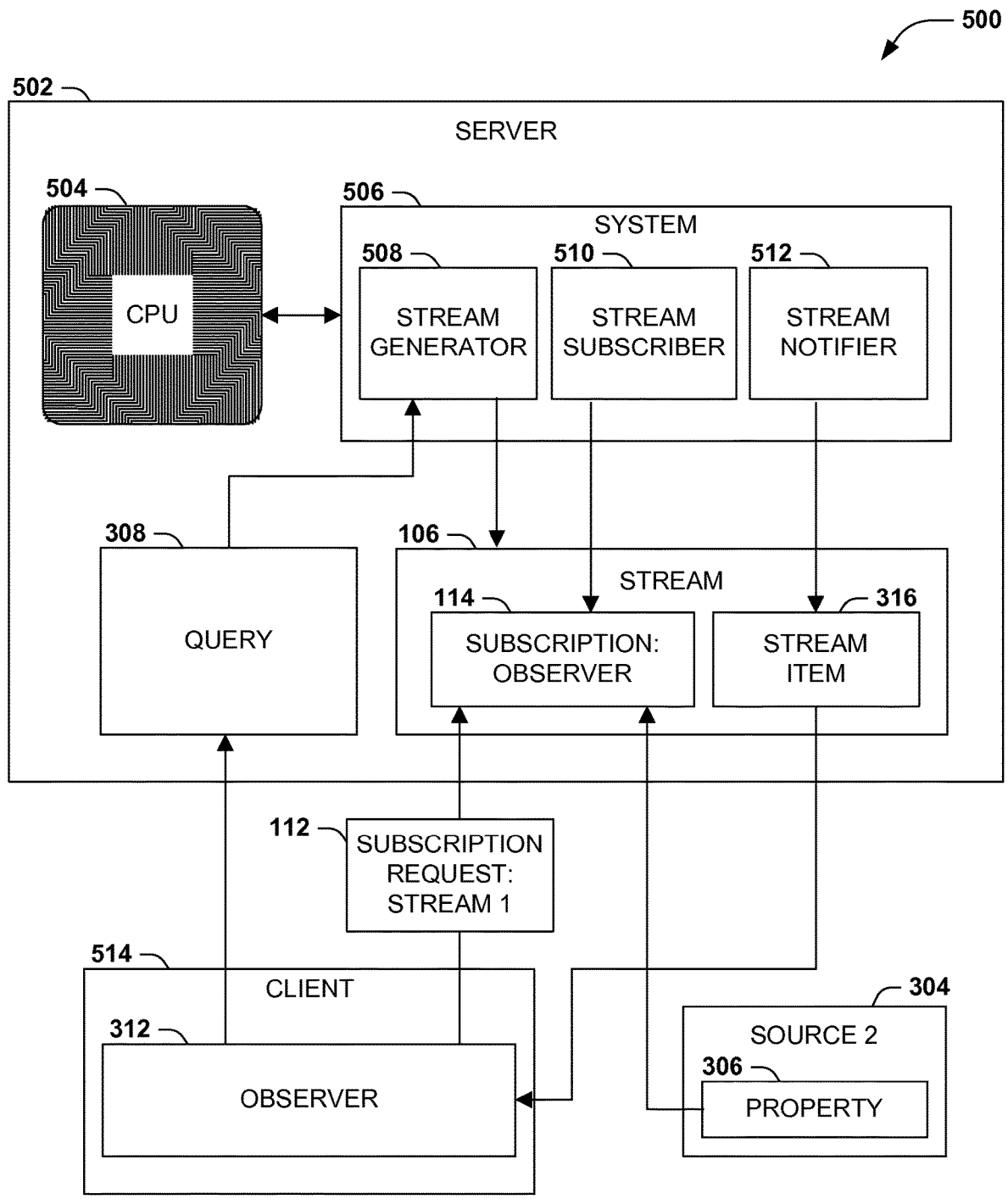
FIG. 5 is a component block diagram illustrating an exemplary server configured to provide a stream-based reactive programming platform to fulfill queries on behalf of clients in accordance with the techniques presented herein.

FIG. 5 presents an illustration of a second exemplary embodiment of the techniques presented herein, illustrated as an exemplary server 502 upon which is implemented an exemplary system 506 for notifying observers 312 executing on various clients 514 of the fulfillment of queries 308. The respective components of the exemplary system 506 may be implemented, e.g., as instructions stored in a memory component of the exemplary server 502 that, when executed on a processor 504 of the exemplary serer 502, cause the exemplary server 502 to perform at least a portion of the techniques presented herein. Alternatively (though not shown), one or more components of the exemplary system 506 may be implemented, e.g., as a volatile or nonvolatile logical circuit, such as a particularly designed semiconductor-on-a-chip (SoC) or a configuration of a field-programmable gate array (FPGA), that performs at least a portion of the techniques presented herein, such that the interoperation of the components completes the performance of a variant of the techniques presented herein.

The exemplary system 506 includes a stream generator 508 that, upon receiving from a client 514 a query 308 specifying a condition 310 involving a property 306 of a source 304, initiates a stream 106 for the query 308. The exemplary system 506 also includes a stream subscriber 510 that, upon receiving from a client 514 a request to subscribe an observer 312 to a stream 106, subscribes the observer 312 as a subscriber 318 of the stream 106. The exemplary system 506 also includes a stream notifier 512 that, upon detecting a fulfillment of the condition 310 of the query 308, identifies at least one subscriber 318 of the stream 106; identify at least one client 514 hosting one or more subscribers 318 of the stream 106; and, for the respective clients 514, transmits a stream item 108 indicating the fulfillment of the condition 310 of the query 308, for delivery to the subscribers 318 hosted by the client 514. In this manner, the architecture and interoperation of the components of the exemplary system 506 of the exemplary server 502 of FIG. 5 to notify the observers 312 and clients 514 of the fulfillment of the condition 310 of the query 308 in accordance with the techniques presented herein.

Still another embodiment involves a computer-readable medium comprising processor-executable instructions configured to apply the techniques presented herein. Such computer-readable media may include communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include computer-readable storage devices involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. As defined herein, the class of computer-readable media identified as computer-readable storage devices exclude the class of computer-readable media identified as communications media.

Figure 6:
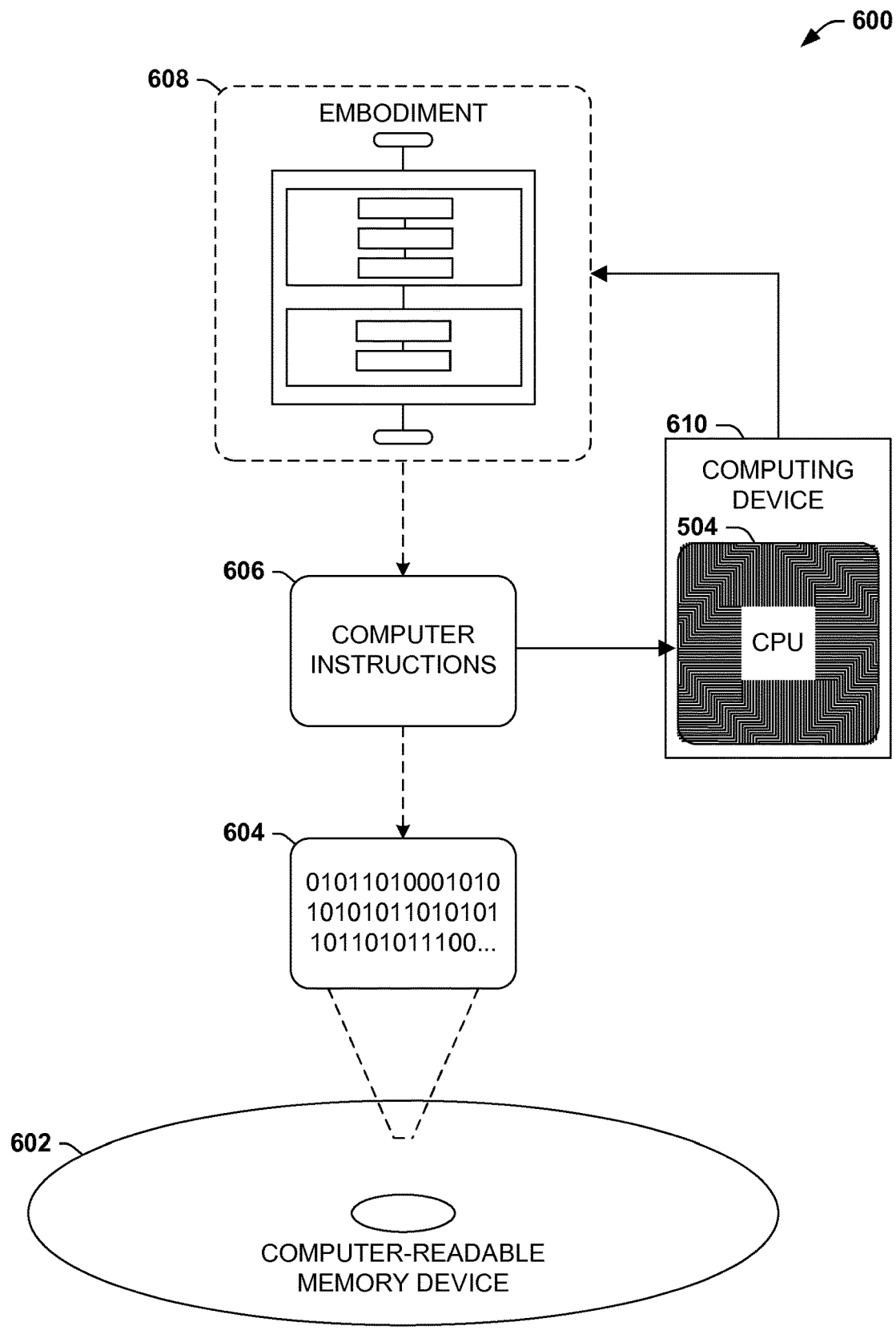
FIG. 6 is an illustration of an exemplary computer-readable medium including processor-executable instructions configured to embody one or more of the provisions set forth herein.

An exemplary computer-readable medium that may be devised in these ways is illustrated in FIG. 6, wherein the implementation 500 comprises a computer-readable memory device 602 (e.g., a CD-R, DVD-R, or a platter of a hard disk drive), on which is encoded computer-readable data 504. This computer-readable data 604 in turn comprises a set of computer instructions 606 that are configured to operate according to the principles set forth herein. In a first such embodiment, the processor-executable instructions 606 may be configured to cause a device to perform a method of notifying observers 312 of the fulfillment of a query 308, such as the exemplary method 400 of FIG. 4. In a second such embodiment, the processor-executable instructions 606 may be configured to implement one or more components of a system for notifying observers 312 and clients 514 of the fulfillment of the condition 310 of a query 308, such as the exemplary system 506 in the exemplary device 402 of FIG. 5. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 400 of FIG. 4; the exemplary system 506 of FIG. 5; and the exemplary computer-readable memory device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized in a variety of devices, such as laptops, tablets, phones and other communication devices, headsets, earpieces, eyewear, wristwatches, portable gaming devices, portable media players such as televisions and music players, mobile navigation devices, mobile appliances, and vehicles.

As a second variation of this first aspect, the techniques presented herein may be utilized to provide streams 106 involving a variety of sources 304 and properties 306, such as data stored by a database server; web content stored by a webserver; files stored by a file system; media stored by a media server, such as audio, still or moving images, or multi-dimensional renderings; and fields 104 or members of various objects 102 in an object-oriented system.

As a third variation of this first aspect, the techniques presented herein may be utilized to fulfill many types of queries 308 and conditions 310 thereof. Such queries 308 and/or conditions 310 may be presented in a variety of query languages, such as a natural-language query; a variant of the Structured Query Language (SQL), the XML Path Language (XPath); a language-integrated query; and/or instructions specified in an imperative, declarative, and/or functional programming language.

As a fourth variation of this first aspect, the techniques presented herein may be utilized to accept and fulfill such queries 308 on behalf of a variety of observers 308, including humans, devices, applications, and/or processes. As a first such example, one or more observers 312 may also comprise sources 304 and/or streams 106; e.g., a first observer 312 may submit a first query 308 generating a first stream 106 and modifying a property 306 of the first observer 312 in response thereto, and a second observer 312 may submit a second query 308 where the condition 310 involves the property 306 of the first observer 312, thus prompting the initiation of a second stream 106 notifying the second observer 312 of updates to the property 306 of the first observer 312 in response to the first stream 106. As a second such example, graphs of such observers 312 and sources 304 may be generated as a stream-based reactive programming model provided to process streams 106 of updates to an initial set of sources 304. As a third such example, an observer 308 may specify a subscription 114 whereby the observer 308 is directly notified of the stream items 316 published to the stream 106; may specify another object of the stream-based programming platform as the observer 308 to be notified of stream items 316 published to the stream 106; and/or may provide an agent to be accepted and invoked for the respective stream items 316, e.g., an expression tree to be applied to each such stream item 3167. As a fourth such example, an observer 308 may also participate in the stream 106 as a source 304; e.g., an object of the reactive stream-based programming platform may both place stream items into the stream 106, and observe stream items placed into the stream (by itself and/or other sources 304). Many such scenarios may be devised that are suitable for application of the techniques presented herein.

E2. Creating Sources and Streams

A second aspect that may vary among embodiments of the techniques presented herein involves the creation of sources 304 and/or streams 106 based thereupon.

As a first variation of this second aspect, a stream platform 302 implementing the techniques presented herein may store a set of sources 304, and may allow requests to create streams 106 specify the respective sources 304. Moreover, such stream platforms 302 may accept and fulfill requests to create a new source 304 for which streams 106 may be created. For example, a server 502 providing a streaming service may comprise a source set storing at least one source 304, and may fulfill requests to create a source 304 from a data item by creating a new source 304 comprising a property 306 that is associated with the data item, and storing the new source 304 in the source set. Such data items of new sources 304 may comprise, e.g., a resource or a piece of data stored on a webserver; a record of a new database; or a field of an object 102. The server 502 may then accept queries 308 applying to the new source 304; generate streams 106 associated with the new source 304; accept subscription requests 112 specifying streams 106 for the new source 304; and notify subscribers 318 of stream items 316 involving the property 306 of the new source 304. The server 502 may therefore enable a non-reactive data store to participate in the reactive programming model, and may do so by receiving updates pushed from the data store, and/or by polling the data store for updates (e.g., by monitoring the data item to detect a data item update, and upon detecting a data item update of the data item, registering the data item update as an update of the property 306 of the new source 304).

Figure 7:
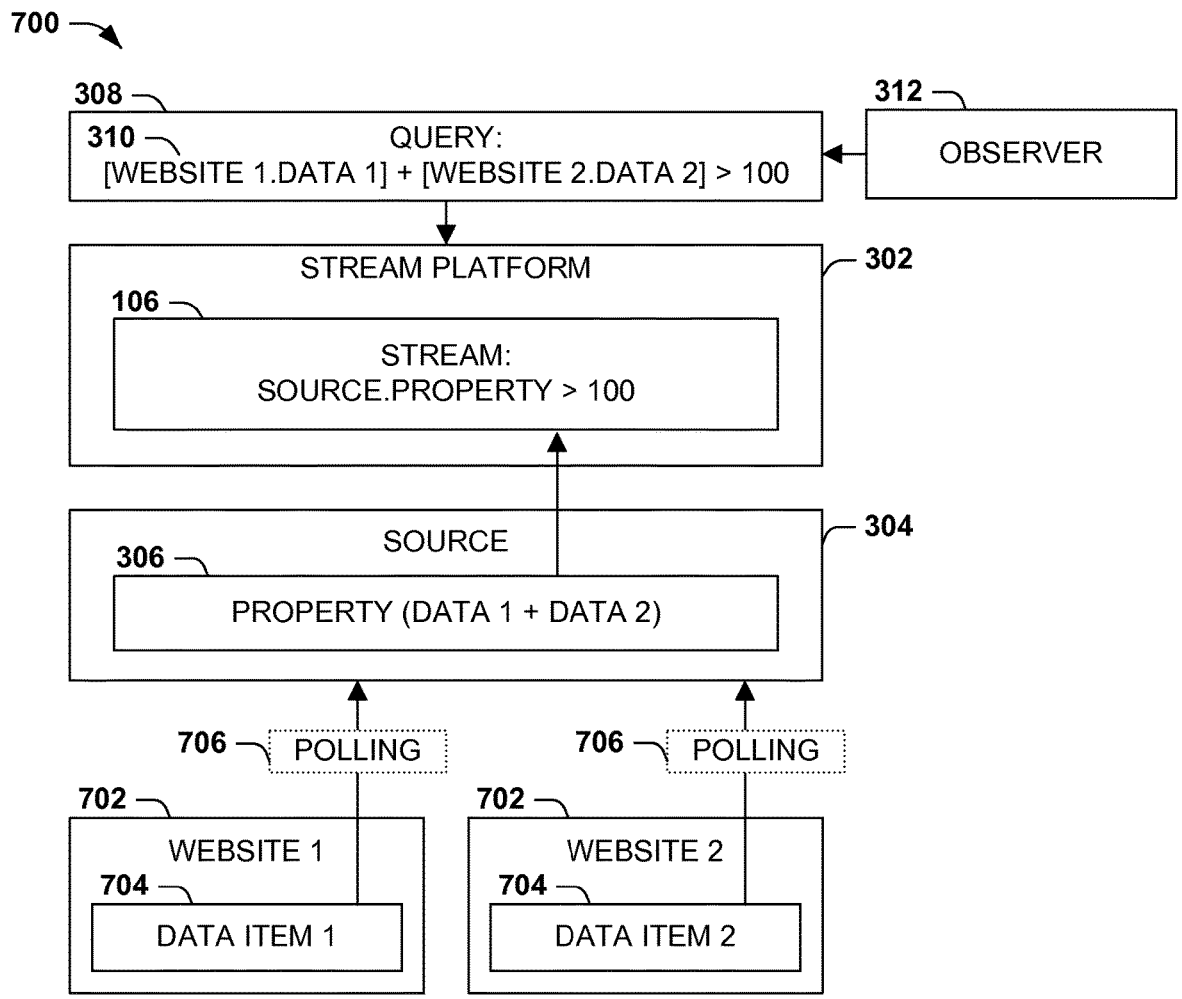
FIG. 7 is an illustration of an exemplary scenario featuring a technique for generating a stream of updates to a property of a source based on a federation of data items in accordance with the techniques presented herein.

FIG. 7 presents an illustration of an exemplary scenario 700 featuring a second variation of this second aspect, wherein a stream platform 302 implementing the techniques presented herein generates a stream 106 from a query 308 specifying a condition 310 involving a comparison of data items 704 stored on two websites 702. In this exemplary scenario 700, even though the websites 702 are not natively configured to participate in the reactive programming model, the stream platform 302 may adapt to allow the observer 304 to interact with the data items 704 stored therein within the reactive programming model. For example, the stream platform 302 may first create a source 304 having a property 306 comprising the result of the condition 310 (e.g., the sum of the specified data items 704), and then create a stream 106 based on the property 306 of the source 304. The stream platform 302 may also facilitate the inclusion of the websites 702 in the reactive model, e.g., by polling 706 each website 702 to detect data item updates to the data items 704 stored thereby. In addition to enabling the expansion of the reactive programming model to include sources of data items 704 that are not natively configured for such involvement, this technique enables the fulfillment of queries 308 and the provision of streams 106 involving a federation of a plurality of sources 304 and properties 306. Such federation may be more readily achievable by the reactive stream-based programming platform provided herein than by other types of stream platforms, such as the data binding platform 110 in the exemplary scenario 100 of FIG. 1 and an event stream coordinator in the exemplary scenario 200 of FIG. 2. For example, the flexibility provided by the stream platform 302 may enable the fulfillment of a query by discovering a variety of devices and services that are capable of performing respective tasks of the query, and may create a stream that enables the interoperation of the selected devices and services to fulfill the query, due to the robustness and flexibility achievable by the stream platform 302. Moreover, the federation may be provided in a manner that enables service-to-service, service-to-device, and device-to-device communication in an equivalent manner as user-to-service and user-to-device, such that the functionality of each element is exposed and available to any other element of the reactive stream-based programming platform.

A third variation of this second aspect involves a query template, specifying a query logic involving one or more query parameters. For example, a query template may comprise a selection of the greatest value among four properties 306 of four different sources 304, and the particular sources 304 may be specified as parameters of the query template. A query 308 may therefore be submitted by an observer 312 by specifying the query template and the entities (e.g., the properties 306, sources 304, and/or query logic) to apply to the query template, without having to specify the portions of the query template that are specified rather than parameterized. The stream platform 302 may fulfill the query by generating the query 308 from the query template and binding the entity for each query parameter as specified in the request. As a first such example, a selected query parameter of the query template may comprise a property 306 and/or source 304, and the submission of the query 308 may specify the particular property 306 and/or source 304 to be bound to the selected query parameter. As a second such example, a selected query parameter of the template query may comprise a query logic of the query, and the request submitting the query 308 may specify the query logic as the entity to be bound to the selected query parameter. The query logic may be specified, e.g., as a portion of a query written in a query language, such as the Structured Query Language (SQ); an expression tree; a code block or lambda expression provided with an invocation of a query generating request method through an interface of a stream platform 302; or as an identifier of a delegate implementing a method to be used for the query logic (e.g., a reference to an instance of a class that implements an interface as a provider of a query logic). As a third such example, the various elements of the reactive stream-based programming platform may share a set of properties, such as parameters that may be specified to configure the functionality of each such element for participating in a stream 106. For example, the stream platform 302 may support the specification of parameters for the respective streams 106, sources 304, observers 312, and subscriptions 114 that may affect the functionality of each such element. For example, the respective elements may be templatized according to an object type (e.g., a type of object 102 published within the stream 106), and any element may have functionality directed to a particular type of object 102 specified as a parameter, such that all of the elements involved in the stream may be interoperatively configured to respond correspondingly to the object type of interest.

Figure 8:
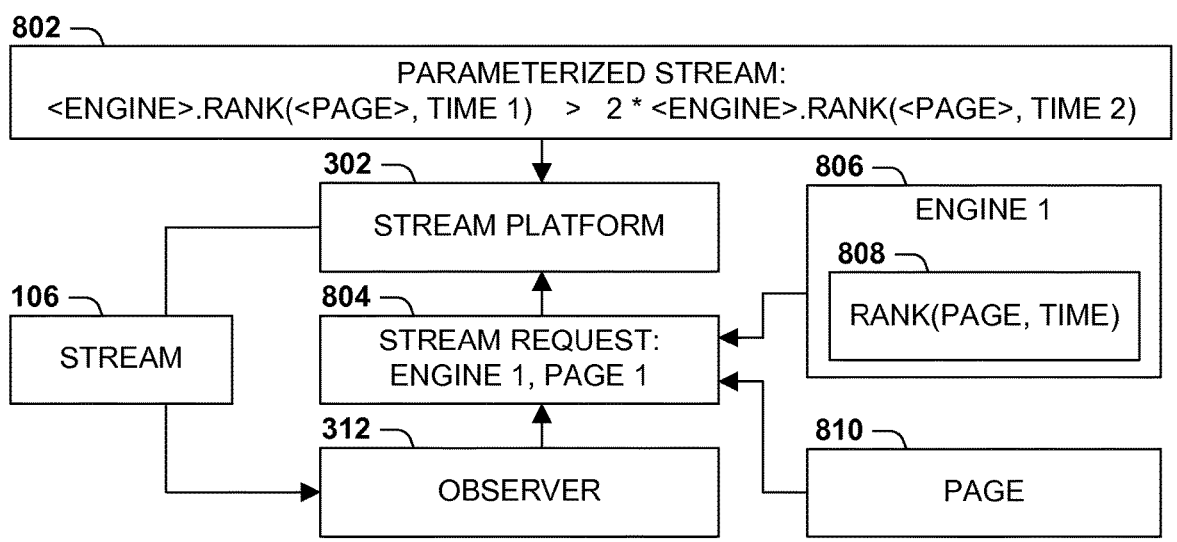
FIG. 8 is an illustration of an exemplary scenario featuring a stream generated from a parameterized query, with respective parameters bound to an object of a stream-based reactive programming platform, in accordance with the techniques presented herein.

FIG. 8 presents an illustration of an exemplary scenario 800 featuring the creation of a parameterized stream 802. In this exemplary scenario 800, an observer 312 seeks to access a data source, such as a search engine 806 providing data in response to a search request, and featuring a ranking method 808 that indicates the search rank of a particular web page 810 at a particular time. The observer 312 may seek to utilize the ranking method 808 of the search engine 806 to detect when a particular web page 810 exhibits a trending popularity, e.g., when the rank of the web page 810 has over twice the magnitude at a first time as at a second time. The stream platform 302 may support such requests by providing a parameterized stream 802, which enables an observer 704 to request notification when any specified search engine 806 detects the specified condition for a particular web page 810. The observer 312 may therefore send to the stream platform 302 a stream request 804 to generate a stream 106 comprising stream items 316 representing detected instances when a particular web page 810 is trending at a particular search engine 806. The observer 312 may initiate this request with the stream platform 302 simply by specifying the parameterized stream 802 and the parameters, i.e., the search engine 806 and the web page 810 to be monitored. The stream platform 302 may accordingly generate a stream 106 for the observer 312, and may participate in the implementation of the stream 106 (e.g., by polling and/or receiving push notifications from the search engine 806, and generating stream items 316 for delivery to the observer 312 via the stream 106). In this manner, the parameterized stream 802 provided by the stream platform 302 may enable any observer 704 to request a stream 106 of trending web page information from any search engine 806, without having to specify the details of the trend detection.

As a fourth variation of this second aspect, a query 308 may specify, in addition to the conditions 106 prompting the insertion of a stream item 316 into a stream 106, the content of the stream items 316 of the stream 106. For example, in addition to specifying a condition 310 such as the comparison of the value of a property 306 with a threshold value, the query 308 may specify that the stream item 316 for the detected fulfillment of the condition 310 specifies the actual value of the property 306. Accordingly, when a stream 106 specifies a stream item content of the stream items 316 to be delivered to subscribers 318 of the stream 106 upon detecting a fulfillment of the condition 310 of the query 308, a stream platform 302 may transmit, with the stream item 316, the stream item content describing the fulfillment of the condition 310. Many such variations may be included in embodiments of the techniques presented herein.

E3. Accessing Sources and Providing Streams

A third aspect that may vary among embodiments of these techniques involves the manner of accessing the sources 304 and providing streams 106 to subscribers 318.

As a first variation of this third aspect, the respective items of the stream platform 302, such as observers 312, sources 304, streams 106, subscriptions 114, queries 308, and/or query templates, may be identified by an identifier, such as a uniform resource identifier (URI), in order for the respective items to refer to one another. As a first example, when specifying a query 308 involving a source 304, an observer 312 may specify the source 304 according to the uniform resource identifier of the source 304. The stream platform 302 may generate a stream 106 for the source 304 (optionally adding the source 304 to the set of available sources 304), and may return a uniform resource identifier identifying the newly created stream 106. As a second example, upon receiving a subscription request 112, a stream platform 302 may store a subscription 114 associated with an identifier, and may return the identifier to the subscriber 318, so that the subscriber 318 may later refer to the subscription 114 according to its identifier, such as during a subsequent request to unsubscribe from the same source 304.

As a second variation of this third aspect, one or more aspects of the stream platform 302 may be accessed via a proxy. As a first such example, upon receiving from a client 514 a request to interact with the stream platform 302, the stream platform 302 may transmit to the selected client 514 a proxy comprising at least one method that, when invoked by the client 514, sends a request to the stream platform 302 on behalf of the client 514. For example, the proxy may comprise an assembly that executes on the client 514 receives local requests, translates such requests into the available and invokable functions of the stream platform 302, handles the transmission of the request to the stream platform 302 (e.g., initiating the request with the stream platform 302; marshaling data types; and ensuring delivery to the stream platform 302), and/or receives any data provided in response by the stream platform 302 (e.g., a uniform resource identifier (URI) provided in response to the request, which may later be used by the proxy in subsequent requests that are related to the first request). In some embodiments, the proxy may handle such requests asynchronously, such as by providing an asynchronous request method that sends the request to the stream platform 302, and an asynchronous response method that receives a response to the request from the stream platform 302.

As a first such example, a proxy may assist with the creation of a source 304. A source creation proxy may provide a method that, upon invocation by the selected client 514, sends a request to the stream platform 302 to create a source 304 according to a source definition. The selected client 514 may request the creation of a source 304 representing the selected client 514 (e.g., a request to be represented in a directory of sources 304 publishing information that may be aggregated into a stream 106), or an alternative data source, such as a website. The source creation proxy may, upon receiving the request, create the source 304 in the stream platform 302 in accordance with the source definition specified in the source definition of the request. For example, the source creation proxy may receive the request, and may invoke a method of the stream platform 302 that results in the creation of the source 304.

As a second such example, a proxy may assist clients 514 in the discovery of sources 304. For example, a source discovery proxy may provide a method that, upon invocation by a client 514, sends a request to the stream platform 302 to describe at least one source 304 (e.g., providing a portion of a directory of subscribable sources 304; identifying one or more sources 304 that meet particular criteria, e.g., sources 304 that provide information about weather alerts; and/or providing more information about a selected source 304). Accordingly, upon receiving such a request from the source discovery proxy, the stream platform 302 may transmit a description of the at least one source 304 to the source discovery proxy for delivery to the client 514.

As a third such example, a proxy may assist clients 514 in interacting with respective sources 304, e.g., to request the generation of a particular type of data for publication in a stream 106. For example, a source interaction proxy may, provide a method that, upon invocation by a client 514, sends a request to the stream platform 302 to initiate an interaction with a specified source 304. Accordingly, upon receiving the request from the source interaction proxy, the stream platform 302 may interacts with the specified source 304 in fulfillment of the request on behalf of the client 514.

Figure 9:
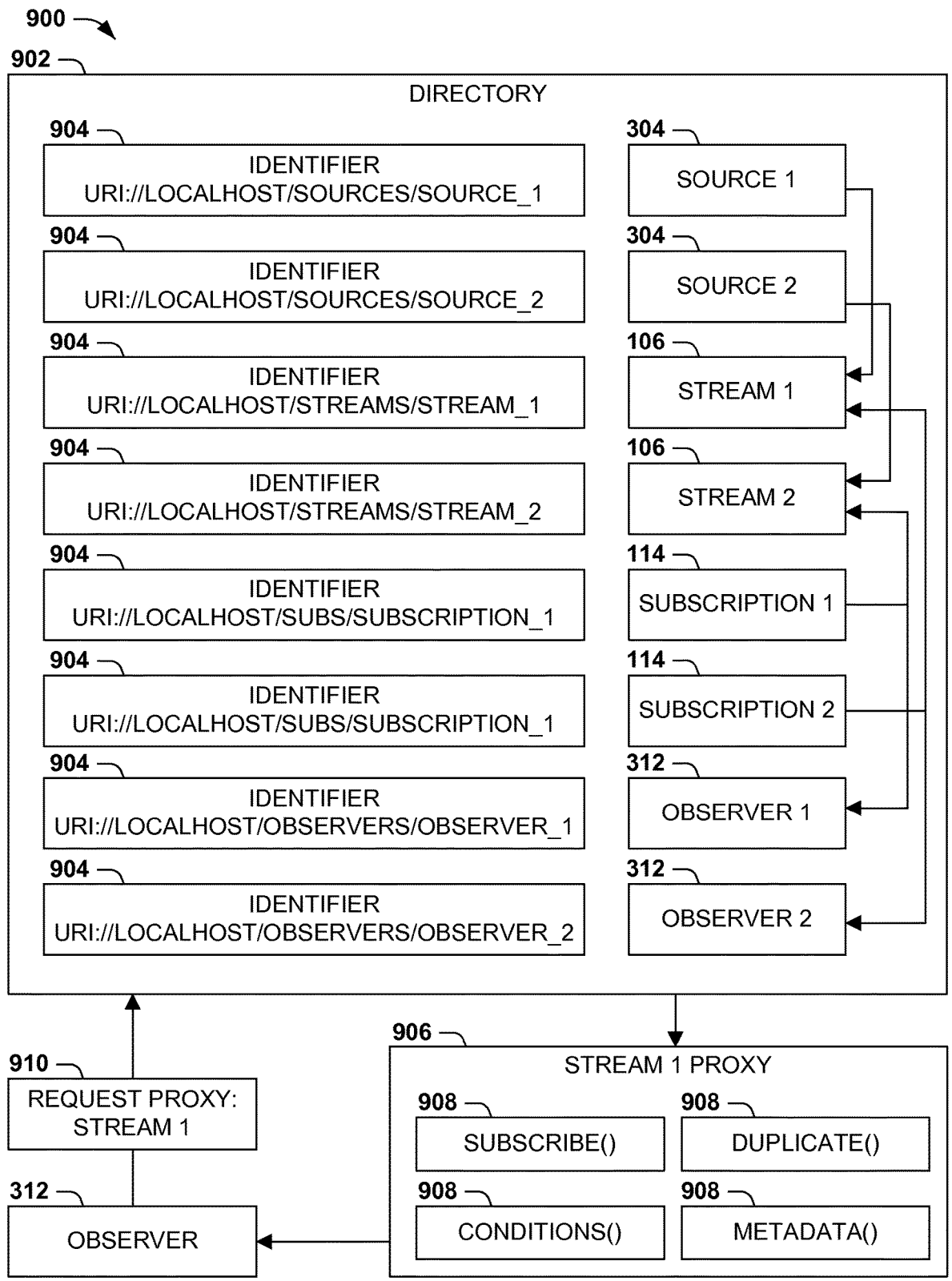
FIG. 9 is an illustration of an exemplary scenario featuring a directory of objects accessible through a proxy provided by a stream-based reactive programming platform in accordance with the techniques presented herein.

FIG. 9 presents an illustration of an exemplary scenario 900 featuring a proxy 904 that assists an observer 312 in participating in a stream platform 302. In this exemplary scenario 900, the stream platform 302 may provide a directory 902 of objects known to and accessible through the stream platform 902, such as a variety of sources 304, streams 106, observers 312, and subscriptions 114. Moreover, respective objects are identified in the directory 902 and the stream platform 302 according to an identifier 904, such as a uniform resource identifier (URI). When an observer 312 requests to access the directory 902, a directory transmitter of the stream platform 312 may transmit to the observer 312 a selected portion of the directory 902 to the observer 312. Additionally, if the observer 312 requests a subscription 114 to a particular stream 106, the stream platform 302 may provide to the observer 312 a stream proxy 906 that enables the observer 312 to interact with the stream 106 through the invocation of various proxy methods 908, such as a stream subscription proxy method 908 enabling an initiation, suspension, removal, or adjustment of the subscription 114 of the observer 312 to the stream 106; a stream subscription duplication proxy method 908 that enables a duplication of the stream 106 and/or the subscription 114; a stream condition proxy method 908 that enables the observer 312 to adjust the conditions of the subscription 114, such as the frequency or criteria of stream items of interest to the observer 312; and/or a stream metadata proxy method 908 that describes various aspects of the stream 106 for the observer 312. The observer 312 may invoke the proxy methods 908 of the proxy 906 to interact with the first stream 106 through the stream platform 302, and the stream proxy 906 may transmit proxy requests 910 to the stream platform 302 in order to achieve such interaction. The stream platform 302 may provide other stream proxies 906 for interacting with other streams 106, and the observer 312 may store and invoke the respective stream proxies 906 in order to interact with a variety of streams 106 of the stream platform 302.

Figure 10:
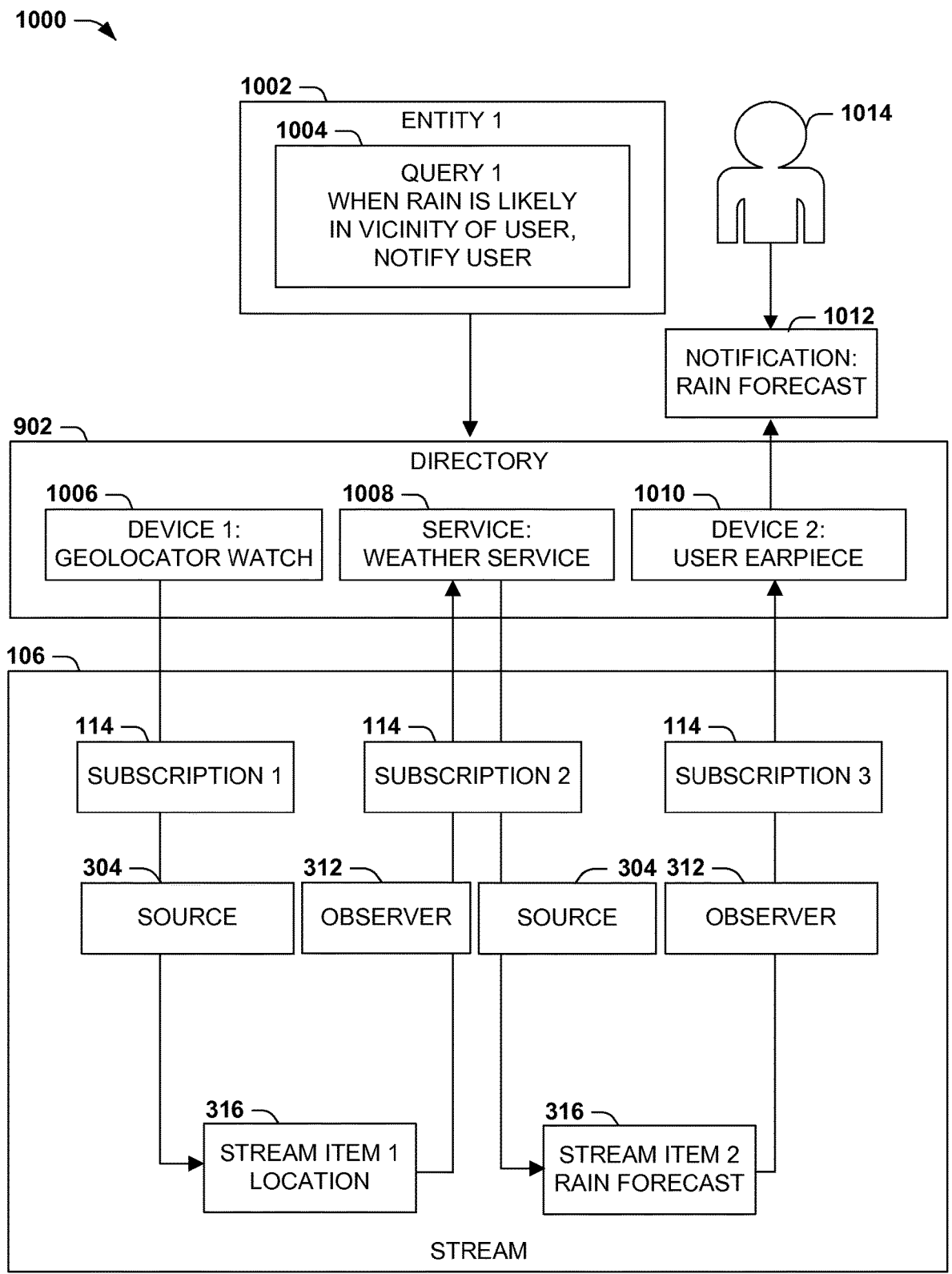
FIG. 10 is an illustration of an exemplary scenario featuring a federation of devices and services to which aspects of a query are delegated within the stream-based programming platform in accordance with the techniques presented herein.

FIG. 10 presents an illustration of an exemplary scenario 1000 featuring the use of the techniques presented herein to enable an entity 1002 to achieve a fulfillment of a query 1004 using the reactive stream-based platform. In this exemplary scenario 1000, the entity 1002 receives a query 1004, such as a request to notify a user 1014 upon detecting a forecast of rain in the vicinity of the user 1014. The entity 1002 may determine that the query 1004 comprises three tasks: the detection of the location of the user 1014; the determination of a rain forecast for the location for the user 1014; and the notification of the user 1014 when such a rain forecast is identified (e.g., when the likelihood of rain within a mile of the user's location exceeds a 75% probability).

In order to achieve the fulfillment of this query 1004, the entity 1002 may first consult a director 902 of the objects that are accessible within the reactive stream-based programming platform. Within the directory 902, the entity 1002 may discover a first device 1006 is capable of detecting the location of the user 1014 (such as a geolocator wristwatch); a service 1008 that is capable of receiving the location of the user 1014 and identifying a rain forecast for the location; and a second device 1010 that is capable of presenting a notification 1012 to the user 1014 (e.g., an earpiece device worn by the user 1014).

The entity 1002 may federate the computational resources of these objects of the reactive stream-based programming platform to achieve the fulfillment of the query 1004 by requesting the generation of a stream 106, wherein the first device 1006 has a first subscription 114 as a source 304; the service 1008 has a second subscription 114 as both an observer 312 and a source 304; and the second device 1010 has a third subscription 114 as an observer 312. The generation of such a stream 106 is therefore an example of delegation, where the entity 1002 delegates the respective tasks of the query 1004 to the respective objects of the reactive stream-based programming platform, and also may involve an example of parameterization, e.g., wherein the second subscription 114 of the service 1008 indicates that the service 1008 specifically responds to the location of the user 1014 by providing a rain forecast, and, optionally, only if the rain forecast exceeds a threshold probability of rain, such as a 75% probability.

Accordingly, when the first device 1006 detects the location of the user 1014, the first device 1006 publishes the location to the stream 106 as a first stream item 316, e.g., the geographic coordinates of the user's location. The service 1008, as an observer 312, receives a notification of the first stream item 316 specifying the user the location, determines a rain forecast for the location, and, if rain is probable, publishes a second stream item 316 to the stream 106 indicating the rain forecast. The second stream item 316 is received by the second device 1010, and is therefore presented as a notification 1012 to the user 1014. In this manner, the objects of the reactive stream-based programming platform are delegated respective tasks, and are interopartively coordinated by the stream 106 to achieve the query 1004 in a federated manner. Many such variations in the architecture of the stream platform 302 may be devised in order to implement the techniques presented herein.

F. Computing Environment

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments to confer individual and/or synergistic advantages upon such embodiments.

Figure 11:
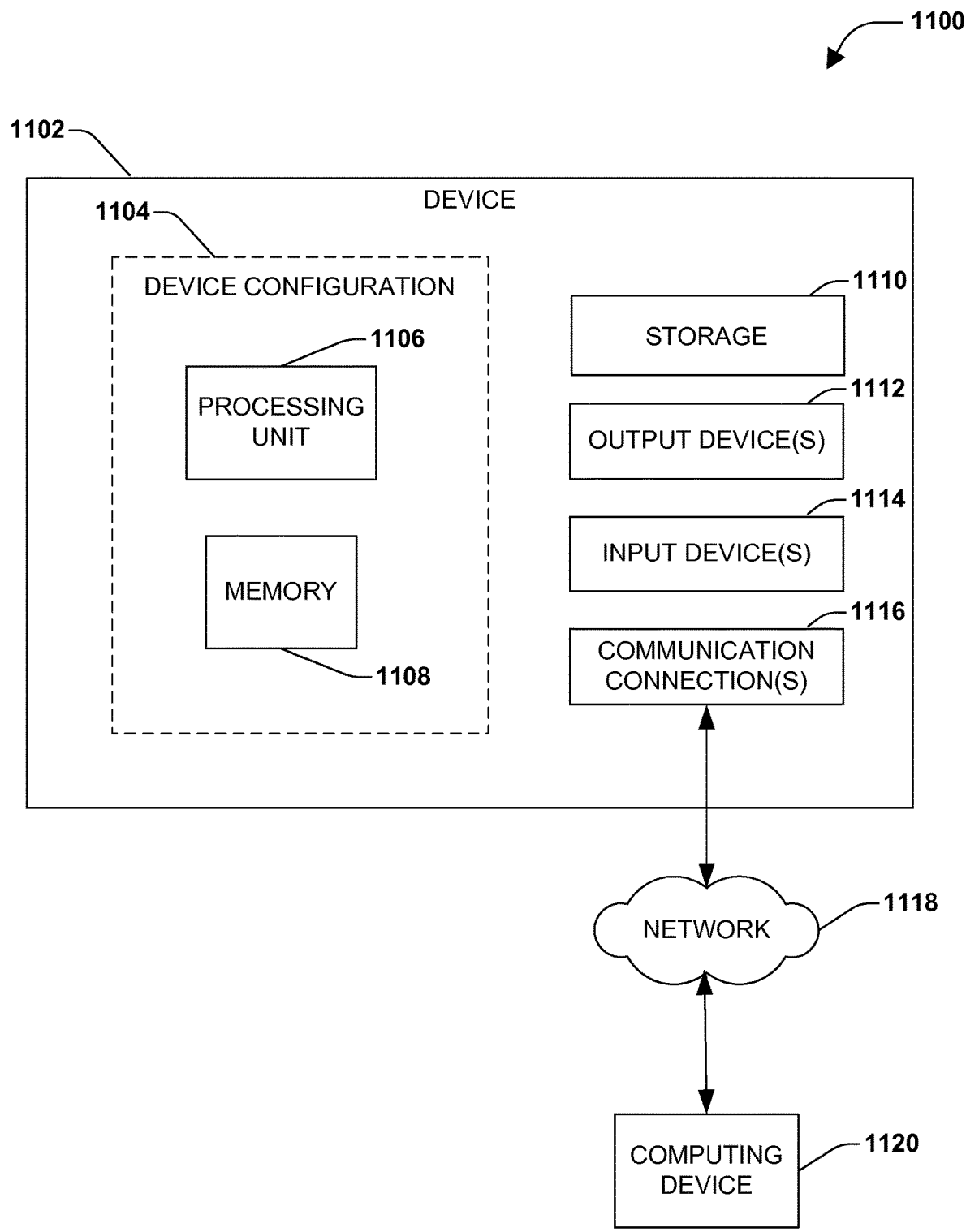
FIG. 11 is an illustration of an exemplary computing environment wherein a portion of the present techniques may be implemented and/or utilized.

FIG. 11 and the following discussion provide a brief, general description of a suitable computing environment to implement embodiments of one or more of the provisions set forth herein. The operating environment of FIG. 11 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 11 illustrates an example of a system 1100 comprising a computing device 1102 configured to implement one or more embodiments provided herein. In one configuration, computing device 1102 includes at least one processing unit 1106 and memory 1108. Depending on the exact configuration and type of computing device, memory 1108 may be volatile (such as RAM, for example), non-volatile (such as ROM, flash memory, etc., for example) or some combination of the two. This configuration is illustrated in FIG. 10 by dashed line 1104.

In other embodiments, device 1102 may include additional features and/or functionality. For example, device 1102 may also include additional storage (e.g., removable and/or non-removable) including, but not limited to, magnetic storage, optical storage, and the like. Such additional storage is illustrated in FIG. 10 by storage 1110. In one embodiment, computer readable instructions to implement one or more embodiments provided herein may be in storage 1110. Storage 1110 may also store other computer readable instructions to implement an operating system, an application program, and the like. Computer readable instructions may be loaded in memory 1108 for execution by processing unit 1106, for example.

The term "computer readable media" as used herein includes computer storage media. Computer storage media includes volatile and nonvolatile, removable and non-removable media implemented in any method or technology for storage of information such as computer readable instructions or other data. Memory 1108 and storage 1110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1102. Any such computer storage media may be part of device 1102.

Device 1102 may also include communication connection(s) 1116 that allows device 1102 to communicate with other devices. Communication connection(s) 1116 may include, but is not limited to, a modem, a Network Interface Card (NIC), an integrated network interface, a radio frequency transmitter/receiver, an infrared port, a USB connection, or other interfaces for connecting computing device 1102 to other computing devices. Communication connection(s) 1116 may include a wired connection or a wireless connection. Communication connection(s) 1116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1102 may include input device(s) 1114 such as keyboard, mouse, pen, voice input device, touch input device, infrared cameras, video input devices, and/or any other input device. Output device(s) 1112 such as one or more displays, speakers, printers, and/or any other output device may also be included in device 1102. Input device(s) 1114 and output device(s) 1112 may be connected to device 1102 via a wired connection, wireless connection, or any combination thereof. In one embodiment, an input device or an output device from another computing device may be used as input device(s) 1114 or output device(s) 1112 for computing device 1102.

Components of computing device 1102 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1102 may be interconnected by a network. For example, memory 1108 may be comprised of multiple physical memory units located in different physical locations interconnected by a network.

Those skilled in the art will realize that storage devices utilized to store computer readable instructions may be distributed across a network. For example, a computing device 1020 accessible via network 1118 may store computer readable instructions to implement one or more embodiments provided herein. Computing device 1102 may access computing device 1020 and download a part or all of the computer readable instructions for execution. Alternatively, computing device 1102 may download pieces of the computer readable instructions, as needed, or some instructions may be executed at computing device 1102 and some at computing device 1120.

G. Use of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A computer-implemented method of fulfilling queries of a source, the method comprising:

receiving, from a first observer other than the source, a query comprising a condition involving a property of a source;

based on the query, creating a new stream for the query on behalf of the first observer, wherein the new stream includes stream items specific to the condition of the query;

adding the first observer as a subscriber of the new stream;

listing the new stream in a directory accessible to a plurality of additional observers;

receiving, from a second observer, a subscription request for the new stream;

based on receiving the subscription request, adding the second observer as a subscriber of the new stream; and upon detecting a fulfillment of the condition of the query:

identifying at least one subscriber of the new stream; and delivering, to the at least one subscriber of the new stream, a stream item indicating the fulfillment of the condition of the query.

2. The method of claim 1, wherein:

the first observer, the new stream, and the source are respectively identified by a uniform resource identifier; and the subscription request identifies the new stream according to the uniform resource identifier of the new stream.

3. The method of claim 1, wherein:

the device further comprises a source set storing at least one source; and to the method further comprises, upon receiving a request to create a source from a data item:

creating a new source comprising a property that is associated with the data item;

storing the new source in the source set.

4. The method of claim 3, wherein:

the request specifies an identifier of the source; and creating the new source further comprises: assigning to the source the identifier specified in the request.

5. The method of claim 3, wherein creating the new source further comprises:

monitoring the data item to detect a data item update; and upon detecting a data item update of the data item, registering the data item update as an update of the property of the new source.

6. The method of claim 1, wherein:

the query specifies an identifier of the new stream; and initiating the new stream for the query further comprises: assigning to the new stream the identifier specified in the query.

7. The method of claim 1, wherein the condition of the new stream involves a first property of a first source and a second property of a second source that is different from the first source.

8. A system for configuring a server having a processor and a memory to fulfilling queries on behalf of clients, the system comprising:

a stream generator comprising instructions stored in the memory that, when executed on the processor, cause the server to, upon receiving from a first client a query specifying a condition involving a property of a source, initiate a new stream for the query, wherein the new stream includes stream items specific to the condition of the query, and list the new stream in a directory accessible to the first client and a plurality of additional clients;

a stream subscriber component comprising instructions stored in the memory that, when executed on the processor, cause the server to, upon receiving from a client a request to subscribe an observer to a stream, subscribe the observer as a subscriber of the new stream; and a stream notifier comprising instructions stored in the memory that, when executed on the processor, cause the server to, upon detecting a fulfillment of the condition of the query:
identify at least one subscriber of the new stream;
identify at least one client hosting at least one subscriber; and
for the at least one client, transmit a stream item indicating the fulfillment of the condition of the query for delivery to the at least one subscriber.

9. The system of claim 8, wherein the execution of instructions by the processor further causes the server to, upon receiving from a selected client a request to interact with the server, transmit to the selected client a proxy comprising at least one method that, when invoked by the selected client, sends a request to the server.

10. The system of claim 9, wherein:
the proxy further comprises a source creation proxy comprising at least one method that, upon invocation by the selected client, sends a request to the server to create a source according to a source definition; and
the execution of the instructions on the processor further causes the server to, upon receiving the request from the source creation proxy, creates the source in accordance with the source definition specified in the request.

11. The system of claim 9, wherein:
the proxy further comprises a source discovery proxy comprising at least one method that, upon invocation by the selected client, sends a request to the server to describe at least one source; and
the execution of instructions by the processor further causes the server to, upon receiving the request from the source discovery proxy, transmit to the selected client a description of the at least one source.

12. The system of claim 9, wherein:
the proxy further comprises a source interaction proxy comprising at least one method that, upon invocation by the selected client, sends a request to the server to initiate an interaction with the at least one source; and
the execution of instructions by the processor further causes the server to, upon receiving the request from the source interaction proxy, interact with the at least one source in fulfillment of the request.

13. The system of claim 9, wherein the at least one method further comprises:
an asynchronous request method that sends the request to the server; and
an asynchronous response method that receives from the server a response to the request.

14. The system of claim 8, wherein:
the directory describes at least one source, at least one stream, and at least one observer accessible to the server; and the system further comprises a directory transmitter that, upon receiving from a selected client a request to provide a selected portion of the directory, transmits the selected portion of the directory to the client.

15. A computer-readable memory device storing instructions that, when executed on a processor of a device, cause the device to fulfill queries of a source for observers, by:
upon receiving, from a first observer other than the source, a query comprising a condition involving a property of a source, initiating a new stream for the query on behalf of the first observer wherein the new stream includes stream items specific to the condition of the query;
adding the first observer as a subscriber of the new stream;
listing the new stream in a directory accessible to a plurality of additional observers;
upon receiving, from a second observer, a subscription request for the new stream, adding the second observer as a subscriber of the new stream; and
upon detecting a fulfillment of the condition of the query:
identifying at least one subscriber of the new stream including at least the second observer; and
delivering, to the at least one subscriber of the new stream, a stream item indicating the fulfillment of the condition of the query.

16. The computer-readable memory device of claim 15, wherein:
the device further comprises a query template specifying a query logic involving a query parameter; and
executing the instructions on the processor further causes the device to, upon receiving a request to generate a query using the query template and an entity for the query parameter:
generates the query from the query template; and
binds the entity to the query parameter.

17. The computer-readable memory device of claim 16, wherein:
a selected query parameter of the at least one query parameter comprises a query logic of the query; and
the entity bound to the query parameter comprises an expression tree specifying the query logic.

18. The computer-readable memory device of claim 17, wherein the entity specifies the expression tree as an identifier of a delegate comprising a method implementing the expression tree.

19. The computer-readable memory device of claim 17, wherein the request to generate the query includes the expression tree for the entity.

20. The computer-readable memory device of claim 17, wherein:
the new stream specifies a stream item content of the stream item delivered through the new stream, where the stream item content describes the fulfillment of the condition; and
delivering the stream item further comprises: transmitting, with the stream item, the stream item content describing the fulfillment of the condition.

* * * * *